United States Patent

[11] 3,589,215

| [72] | Inventor | Martin B. Bullard<br>7111 Pomelo Drive, Canoga Park, Calif. 91304 |
| --- | --- | --- |
| [21] | Appl. No. | 857,336 |
| [22] | Filed | Sept. 12, 1969 |
| [45] | Patented | June 29, 1971 |

[54] METHOD OF MAKING A CHAIN SAW CUTTING TOOTH
4 Claims, 5 Drawing Figs.

| [52] | U.S. Cl. | 76/112, 29/481, 76/101, 143/135 |
| --- | --- | --- |
| [51] | Int. Cl. | B23d 63/00 |
| [50] | Field of Search | 143/135; 76/112, 101 A; 29/481, 525 |

[56] References Cited
UNITED STATES PATENTS

| 2,483,220 | 9/1949 | Morrow | 76/101 A X |
| --- | --- | --- | --- |
| 3,104,562 | 9/1963 | Kolesh | 76/112 |

Primary Examiner—Bernard Stickney
Attorney—Pastoriza and Kelly

ABSTRACT: A chain saw cutting tooth is fabricated by forming a laterally extending retaining hole through a portion of a metal plate and press-fitting a round-shaped carbide object into the retaining hole. After bonding metal has been deposited and hardened in the space defined between the carbide object and plate, sufficient material is removed by grinding for example from the carbide object, plate and bonding metal in order to construct a cutting tip.

The plate may be integrally formed with a depth gauge and a drive tang.

PATENTED JUN 29 1971  3,589,215

*INVENTOR:*
MARTIN BLYTHE BULLARD
BY
*Pastoriza & Kelly*
ATTORNEYS

METHOD OF MAKING A CHAIN SAW CUTTING TOOTH

BACKGROUND OF THE INVENTION

This invention relates to cutter elements and more specifically to the construction of and process for fabricating chain saw cutting teeth.

Conventional power saws are ordinarily difficult and somewhat hazardous to handle because the cutting teeth of the saw chain tend to skid over the intended cutting path, abruptly jerk out of the kerf being formed, and, slip out of alignment.

One reason for the above disadvantage is that the cutting teeth or elements that are interlinked to constitute the saw chain become worn and dull after relatively short periods of use and, unless constantly resharpened or replaced, are offered great resistance by the workpiece or material which resistance cannot be overridden by the chain cutting action.

One approach aimed at overcoming these disadvantages of conventional saw chains, as explained in U.S. Pat. No. 3,292,675 to Bullard entitled CUTTER ELEMENTS FOR CHAIN SAWS has been to construct the tooth cutting tips from extremely hard material such as carbide, boron hydride, diamond or the like.

It is very difficult however to securely and permanently fix carbide cutting tips on the teeth because, without using complex and expensive techniques, the inherent hardness and other properties of carbide make bonding difficult and the severe impact and fatigue during cutting operations tend to cause loosening and displacement of the carbide cutting tips.

BRIEF SUMMARY OF THE INVENTION

Briefly stated, this invention concerns the structure of a cutting element such as a chain saw cutting tooth and a relatively simple, inexpensive and effective technique for securely installing a round-shaped carbide object within a plate and subsequently working the object to constitute a cutting tip.

The chain saw cutting tooth is characterized by a generally flat metal plate with a front section and a retaining groove formed across a top plate section. Positioned in the retaining groove is a cutting tip characterized by a round-shaped carbide object with truncated faces defined by two intersecting planes aligned generally perpendicularly to the plane of the plate. Bonding metal occupies at least some of the space defined between the cutting tip and groove.

A cutting edge for engaging the workpiece to be cut is defined by one truncated face aligned in coplanar relationship with a top edge of the plate top section and the other truncated face aligned in coplanar relationship with a front edge segment of the plate front section.

Preferably the retaining groove surface is described by a concave surface of constant radius and the carbide object is a ball that engages the concave surface along an arc of line contact. The maximum cutting tip width exceeds the maximum width of the plate top section so that when the tooth is installed in a saw chain the tendency of binding, jamming and bucking is minimized. The plate may be integrally formed with a depth gauge and a drive tang.

The process of making the chain saw cutting tooth described above, is characterized by first cutting or forming a laterally extending retaining hole entirely through the metal plate. The round-shaped carbide object is punched or thrust into the retaining hole where it is centrally aligned and engages the retaining hole wall in circular line contact. After bonding metal has been deposited into spaces defined between the carbide object and retaining hole wall, predetermined amounts of material of the bonding metal, carbide object and plate are removed, by a diamond grinding wheel for example, until the desired cutting tip is constructed.

BRIEF DESCRIPTION OF THE DRAWINGS

The numerous benefits and unique aspects of the present invention will be fully understood when the following detailed description is studied in conjunction with the drawings in which.

DETAILED DESCRIPTION OF THE PREFERRED EMBODIMENT

Figure 1:
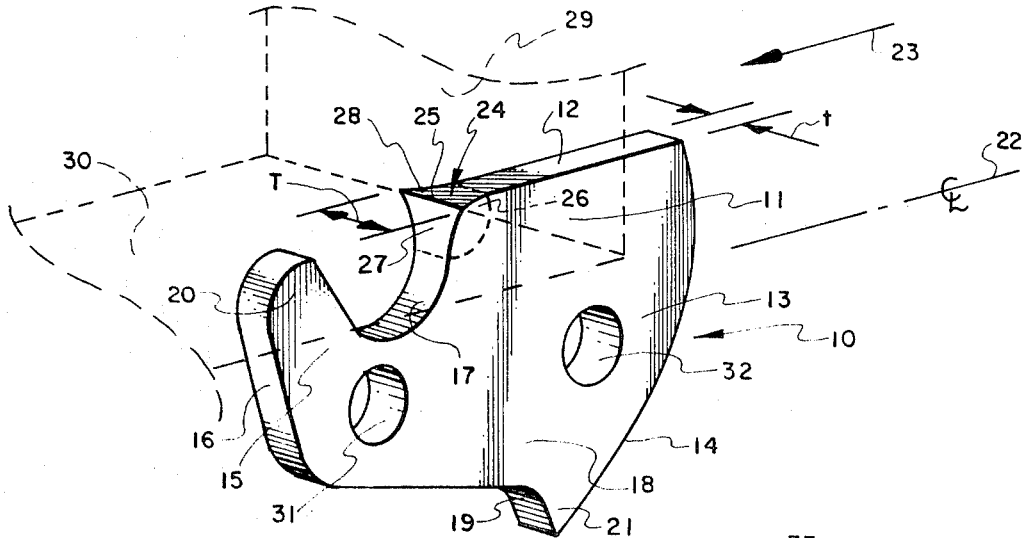
FIG. 1 is a perspective view showing a chain saw cutting tooth fabricated in accordance with this invention.

Referring now to FIG. 1 a power chain saw cutting tooth 10 is shown constructed basically from a generally flat metal plate. Cutting tooth 10 has a top section 11 forming a top edge 12, a rear section 13 forming a rear edge 14, a front section 15 forming a front edge 16 and front edge segment 17, and, a bottom section 18 forming a bottom edge 19.

Cutting tooth 10 is integrally formed with a conventional depth gauge 20 for regulating the maximum cutting depth and a drive tang 21 that can be drivingly engaged by a moving component of the power chain saw (not shown) to continuously urge the saw chain over its cutting path.

Cutting tooth 10 has a longitudinal center line 22 and when linked with other teeth to constitute a saw chain is intended to travel in a direction indicated by arrow 23.

This invention is concerned in part with the manner in which a cutting tip 24, preferably constructed of carbide, is installed and structurally fixed in cutting tooth 10. Cutting tip 24 has a cutting edge 25, and, the dotted line zone 26 represents the portion of tooth 10 occupied primarily by the carbide object and associated bonding metal.

Cutting tip 24 has a front face 27 and a top face 28. Material is removed, by grinding for example, from the carbide object along an imaginary plane 29 until front face 24 is formed, and, along another imaginary plane 30 until top face 28 is formed. Thus the carbide object, previously of a round-shape as shall be explained, is truncated along intersecting planes 29 and 30 which are aligned generally perpendicularly to the plane of cutting tooth 10.

The maximum thickness T of cutting tip 24 at its edge 25 is larger than maximum thickness $t$ of top section 11 so that as a kerf is being cut in a workpiece the tendency of binding and jerky motion is eliminated. Forward and rearward linkage retaining apertures 31 and 32 respectively are formed laterally through cutting tooth 10.

Figure 2:
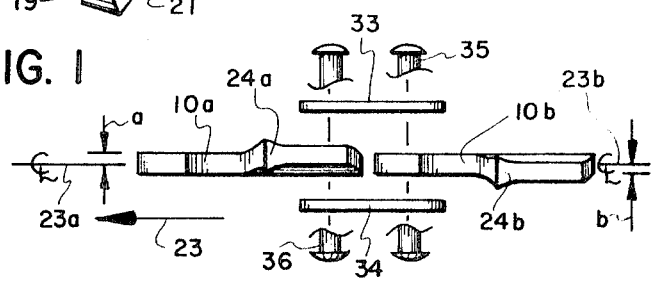
FIG. 2 is an exploded, top view showing how a pair of cutting teeth can be linked together within a power saw chain.

Referring now to FIG. 2 it can be seen that a forward or upstream cutting tooth 10a and a rearward adjacent cutting tooth 10b can be interconnected by a pair of links 33 and 34 and associated rivets or pins 35 and 36. Cutting tip 24a is deflected or offset to one side of tooth 10a and cutting tip 24b is offset to the opposite side of cutting tooth 10b. The combined lateral displacement of cutting tips 24a and 24b constitute the predetermined kerf width that can be cut in a workpiece. Repeated groupings of three or more teeth may be linked together to constitute the completed chain. For example, a grouping of five cutting teeth with one cutting tip erect, two cutting tips bent or offset by different amounts in one direction and two bent or offset by different amounts in the other direction may be employed to constitute a "five element saw chain."

Figure 3:
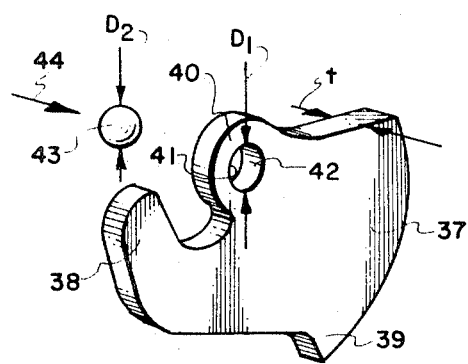
FIG. 3 is a perspective exploded view showing a round-shaped carbide object before it is press-fitted into a retaining opening formed by the plate.

Referring to FIG. 3 a flat plate 37 is shown formed with a depth gauge 38 and drive tang 39. Plate 37 is integrally formed with a boss section or hump 40 in which a laterally extending retaining hole 41 is formed by cutting or some other suitable material removal operation. Retaining hole 41 has a diameter $D_1$ and forms a retaining groove segment 42. A round-shaped carbide object 43 is shown aligned with retaining hole 41 and spaced to one side of flat plate 37. Carbide object 43, shown as a sphere, has a diameter $D_2$ which is slightly larger than retaining hole diameter $D_1$ and is also larger than plate thickness $t$. Hole 42 and carbide object 43 are relatively sized in this manner so that carbide object 43 can be punched or thrust in direction 44 and snugly pressfitted within hole 41.

Figure 4:
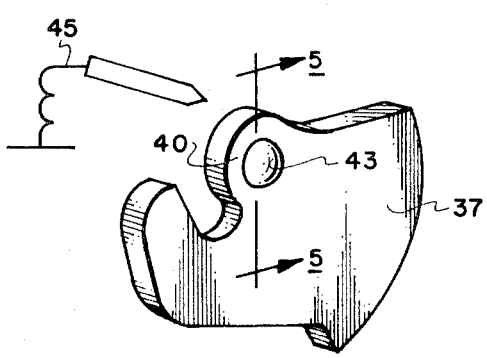
FIG. 4 is a perspective partially schematic view showing the carbide object press-fitted into the retaining hole and apparatus for depositing bonding metal into the space defined between the carbide object and retaining opening wall; and, FIG. 5 is a sectional view taken along 5–5 of FIG. 4, showing left and right portions of the space defined between the carbide object and retaining opening wall filled and unfilled, respectively, with bonding metal.

FIG. 4 shows carbide object 43 securely clenched within the hole 41 with diametrically opposed sides bulging or extending beyond the planes of opposing sidewalls of plate 37. A suitable conventional apparatus 45 is shown schematically for depositing a bonding metal within two annular shaped spaces defined by the retaining hole wall and carbide object 43. The bonding metal may for example be nickel, pure copper, silver, or any suitable alloy such as a blend of 60 percent silver, 30 percent copper, and 10 percent zinc magnesium.

Figure 5:
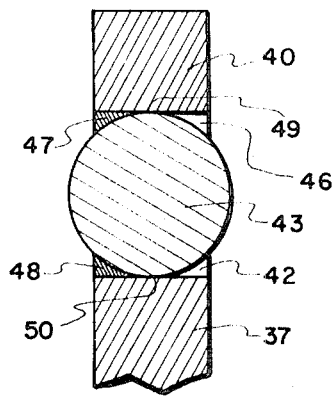

FIG. 5 shows the resulting annular spaces 46 formed between object 43 and hole 41. The left side annular space is shown filled with slugs or masses of bonding metal 47 and 48 deposited from apparatus 45. Carbide object 43 and retaining hole 41 are engaged in circular line contact as indicated by upper arcuate point 49 and lower arcuate point 50.

OPERATION

Keeping the above structure and process in mind it can be understood how disadvantages of conventional chain saw cutting teeth are overcome or substantially eliminated by the present invention.

A single chain saw cutting tooth 10 is initially fabricated by cutting or otherwise forming a laterally extending retaining hole 41 through the hump 40 of flat plate 37 (referring to FIG. 3). Round-shaped object 43, constructed of carbide or other extremely hard metal, is thrust manually or by machine in direction 44 until it is press-fitted and centrally aligned in retaining hole 41. Retaining hole 41 serves as a holding fixture to securely locate object 43 at a predetermined position where a material removing device can operate upon it.

Carbide object diameter $D_2$ is sufficiently larger than hole diameter $D_1$ in order to permit an ideal press-fit to be accomplished. Carbide object diameter $D_2$ is also larger than the plate thickness $t$ so that the cutting tip 24 to eventually be shaped can be dimensioned with forwardly flaring front walls which terminate at their upper portions in cutting edge 25 that is wider than thickness $t$. By making cutting edge 25 larger than thickness $t$ then when cutting tooth 10 is subsequently pivotably or otherwise articulately linked with other teeth to constitute a saw chain, the tendency by one or more teeth to bind, buck and jam is greatly minimized.

When carbide object 43 is firmly locked in place, referring to FIGS. 4 and 5, it establishes circular line contact with the wall of retaining hole 41. On both sides of this circular contact line the plate 37 and its hump 40 are spaced from carbide object 43 to define a pair of symmetrical annular spaces 46 (only the right side annular space is shown). The existence of these annular spaces 46 permits a superior bond to be established between plate 37 and object 43 through the medium of conventional bonding metal 47 and 48. In practice the bonding metal could be deposited by apparatus 45 into annular spaces 46 and then secured therein by welding, soldering or brazing techniques. The bonding area is especially large when the carbide object 43 is a sphere and therefore the best bonding results would occur under these circumstances.

When the bonding metal has been satisfactorily bonded within the annular spaces 46 a conventional diamond wheel, for example, may be employed to remove material by grinding. The grinding proceeds along plane 29 (referring to FIG. 1) until front face 27 of cutting tip 24 results. In a similar manner grinding proceeds along plane 30 until top face 28 is shaped. The cutting tip front face 27 and top face 28 have been described as planar for purposes of explaining the invention; it should be understood however, that they could be slightly curved if desired.

When a series of cutting teeth have been completely fabricated, with cutting tips 24, depth gauges 20 if desired, drive tangs 21 and linkage apertures 31 and 32 they are essentially ready for being incorporated into a saw chain. When it is desired to construct a five element scratcher chain, for example, one cutting tip would be deflected a maximum distance to the left, a second tip would be deflected a minimum distance to the left, a third tip would remain erect, a forth tip would be deflected a maximum distance to the right, and, a fifth tip would be deflected a minimum distance to the right. Together, these five cutting teeth when interconnected by links 33 and 34, would constitute a "five element chain," a plurality of groupings which would be incorporated within the overall power saw chain.

The ultimately constructed saw chain could then be assembled in a power saw in the customary manner and used by a home owner, novice sawyer, professional sawyer or carpenter.

From the foregoing it will be evident that the present invention has provided a chain saw cutting tooth and method for making it, in which all of the various advantages are fully realized.

What I Claim Is:

1. A process of making a cutting element, comprising the steps of:
    a. forming a laterally extending retaining hole entirely through a metal plate;
    b. positioning a round-shaped carbide object in the retaining hole and causing it to be held within the hole;
    c. depositing bonding metal into a space defined between the round-shaped carbide object and retaining hole wall; and,
    d. removing portions of the carbide object, adjacent metal plate, and adjacent bonding metal to define a cutting tip.

2. The process according to claim 1, wherein the positioning step is accomplished by:
    press-fitting a carbide ball into the retaining hole of slightly less diameter, and, causing the ball to be held in circular line contact within the hole.

3. The process according to claim 1, wherein the removing step is accomplished by,
    grinding away portions of the carbide object, plate, and bonding metal along a first plane, and, grinding away other portions of the carbide object plate, and bonding metal along a second plane that intersects the first plane to define a cutting edge.

4. The process according to claim 1, including the step of:
    bending a top section of the plate carrying the cutting surface out of the plane of the plate.